ns of America 3,125,496
Patented Mar. 17, 1964

3,125,496
RECOVERY OF α-NAPHTHOL FROM MIXTURES OF NAPHTHOL, TETRALON AND TETRALOL
André Thizy, Lyon, Rhone, France, assignor to Progil S.A., Lyon-Vaise, France, a corporation of France
No Drawing. Filed Mar. 13, 1961, Ser. No. 95,043
1 Claim. (Cl. 202—42)

This invention relates to the recovery of α-naphthol from mixtures of α-naphthol, tetralon and tetralol; and, more particularly, to the recovery of α-naphthol in highly purified form from such mixtures by fractional distillation.

It is known that α-naphthol may be obtained from tetralon and tetralol by dehydrogenation. Typically α-naphthol is derived from tetralon and tetralol by dehydrogenation with sulfur in which the sulfur is converted into hydrogen sulfide or by dehydrogenation with finely divided nickel such as Raney nickel. Such reactions ultimately result in an equilibrium whereby mixtures more, or less, rich in α-naphthol together with large quantities of untransformed products are obtained.

One of the most efficient methods of recovering an ingredient from a mixture of liquid, or liquifiable, ingredients is by fractional distillation. Yet so far as is known, it has not heretofore been possible to recover α-naphthol by distillation in a purified state from tetralon. This past inability to recover α-naphthol in a highly purified state by distillation is probably due to the fact that α-naphthol forms an azeotrope with tetralon. For example, a mixture of α-naphthol and tetralon forms an azeotrope having a maximum boiling point of 187° C. under 40 mm. Hg pressure which contains 75% α-naphthol. This boiling point is practically the same as the boiling point of α-naphthol under the same conditions for α-naphthol distills at 184° C. under 40 mm. Hg pressure. Thus it is practically impossible to separate α-naphthol from a mixture thereof with tetralon by direct distillation.

It is a principal object of this invention to provide a process by which α-naphthol can be recovered in a highly purified state by fractional distillation from mixtures thereof with tetralon and tetralol. It is a more particular object of the invention to obtain highly purified α-naphthol from dehydrogenation mixtures such as mentioned above. Other objects and features of the invention will be apparent from the more detailed description which follows.

In accordance with an important embodiment of this invention, it has been found that α-naphthol can be recovered in a highly purified state from mixtures thereof with tetralol and tetralon by subjecting mixtures, such as those set out above, to fractional distillation in the presence of diethylene glycol. It has been found that diethylene glycol forms an azeotropic mixture with tetralon but does not form an azeotropic mixture with α-naphthol. For instance, it is known that diethylene glycol boils at 156.5° C. under 40 mm. Hg pressure. Yet at the same pressure a mixture thereof with tetralon forms an azeotrope containing 55 to 60% of tetralon by weight with a minimum boiling point at 149.5° C. Thus the boiling point of this azeotrope is pronouncedly different from the boiling point of the α-naphthol set out above and is clearly sufficient to permit a full recovery of the azeotropic mixture of diethylene glycol and tetralon below the volatilization temperature of the α-naphthol. An azeotropic mixture of tetralon-tetralol-diethylene glycol boils at approximately the same temperature at 40 mm. Hg. Surprisingly, the tetralon and tetralol appear to suppress the boiling point of the diethylene glycol.

Since the azeotrope with diethylene glycol contains 55–60% tetralon by weight it has been found that diethylene glycol should be added in a quantity at least substantially equalling that of the tetralon or tetralol in order that an adequate amount thereof may be present to form the azeotropic mixture. Experience has taught that usually one to two times as much diethyleneglycol as tetralon is adequate. Since, as stated above, diethyleneglycol boils at 156.6° C. under 40 mm. Hg pressure, it will be seen that any excess diethyleneglycol can be recovered below the distillation temperature of the α-naphthol, namely 184° C. under the same conditions.

Diethyleneglycol, due to its ready availability, inexpensiveness, constitutes a preferred substance having functional groups creating an azeotropic mixture with tetralon and tetralol, but not with α-naphthol, having a volatility pronouncedly different from the azeotropic mixture formed by α-naphthol with tetralon and tetralol thereby permitting the separation of α-naphthol from such mixture in a highly purified form. It has been found, however, that other substances will also form such desirable types of azeotropic mixtures with tetralol and/or tetralon but not with α-naphthol. Among these substances are monohydric alcohols such as 3-phenylpropanol, dodecyl-alcohols; sultams, such as 2,3-dihydrobenzisosulfonazol, and amines such as p-tert.-butylaniline, ethyl-o-toluidine.

The invention will further be understood by reference to purely illustrative processes for the batchwise and distillation column recovery of α-naphthol in a highly purified state from azeotropic mixtures using diethylenglycol as an entrainer.

*Example I*

After the addition of diethylene glycol to a mixture of α-naphthol-tetralon-tetralol in a quantity sufficient to form an azeotropic mixture as set out above, the following fractions were obtained by subjecting the mixture to batchwise distillation at progressively higher temperatures.

(1) An azeotrope of tetralon-tetralol-diethyleneglycol boiling at 149.5° C. under 40 mm. Hg.
(2) The excess of diethylene glycol boiling at 156.5° C. under the same conditions.
(3) Pure α-naphthol boiling at 184° C. under the same conditions.

Where desired, the fraction containing tetralon and tetralol can be freed from diethyleneglycol by water extraction. Typically, however, the fraction containing tetralon, tetralol and diethyleneglycol was recycled to a dehydrogenation cycle such as the ones set out above.

Instead of using a batch process set out in this example, the diethyleneglycol may be applied to a continuous process according to the known usual methods of azeotropic distillation. Also pressures other than 40 mm. Hg may be used so long as the differences between the boiling point of the azeotrope and that of the α-naphthol is sufficient to permit a distinct separation of the two fractions.

*Example II*

In this example, a distillation column was used having a length equivalent to ten theoretical plates. The admixture contained the following ingredients:

| | G. |
|---|---|
| Tetralon | 492 |
| Tetralol | 216 |
| α-Naphthol | 358 |
| Heavy fractions | 84 |
| Diethyleneglycol (added) | 1443 |

The following fractions were recovered successfully under 30 mm. Hg pressure.

| | G. |
|---|---|
| (1) A fraction rich in water resulting from a partial dehydradation of tetralol | 56 |
| (2) An azeotrope boiling at 141–144.5° C. (30 mm. Hg) containing tetralon-tetralol-diethyleneglycol | 981 |
| (3) An intermediate fraction rich in diethyleneglycol and boiling at 146–148° C. (30 mm. Hg) | 186 |
| (4) Excess of diethyleneglycol boiling at 148–148.5° C. (30 mm. Hg) | 790 |
| (5) A fraction rich in α-naphthol and boiling at 145 to 146° C. (14 mm. Hg) | 120 |
| (6) α-Naphthol of melting point 90–93° C. | 245 |
| (7) Residue | 170 |
| Sub total | 2548 |
| Losses (1.73% of the feed) | 45 |
| Total | 2593 |

By diluting fraction 5 with water, 45 g. of α-naphthol was recovered having a melting point of 93° C. thereby permitting the extraction of 81% of the total α-naphthol contained in the original admixture.

The techniques set out above may be used likewise to recover α-naphthol in a purified state from mixtures thereof with tetralon and/or tetralol by using the azeotropic entrainers such as the monohydric alcohols, sulfams and amines set out above.

It will be understood that tetralon is a commercial name for the substance 1-keto-1,2,3,4-tetrahydronaphthalene and that tetralol is a commercial name for the substance 1-hydroxy-1,2,3,4-tetrahydronaphthalene.

The practice of this invention has been exemplified by various details and illustrative embodiments. It will be understood, however, that the details as to specific distillation temperatures and pressures and entrainer substances forming azeotropic mixture are representative and are not intended to be exhaustive for the illustrative details hereof may be varied to a considerable extent without departing from the spirit or the scope of the invention which is intended to be defined by the appended claim.

What is claimed is:

A process for the recovery of purified α-naphthol from mixtures thereof with tetralon and tetralol, which comprises admixing with said mixture diethylene glycol to form an azeotropic mixture with tetralon and tetralol, fractionally distilling off the tetralon and tetralol as an overhead azeotropic mixture with the diethylene glycol, and recovering purified α-naphthol as an intermediate distillate.

References Cited in the file of this patent
UNITED STATES PATENTS

| 1,879,337 | Laage | Sept. 27, 1932 |
| 2,595,266 | Johnson | May 6, 1952 |